UNITED STATES PATENT OFFICE.

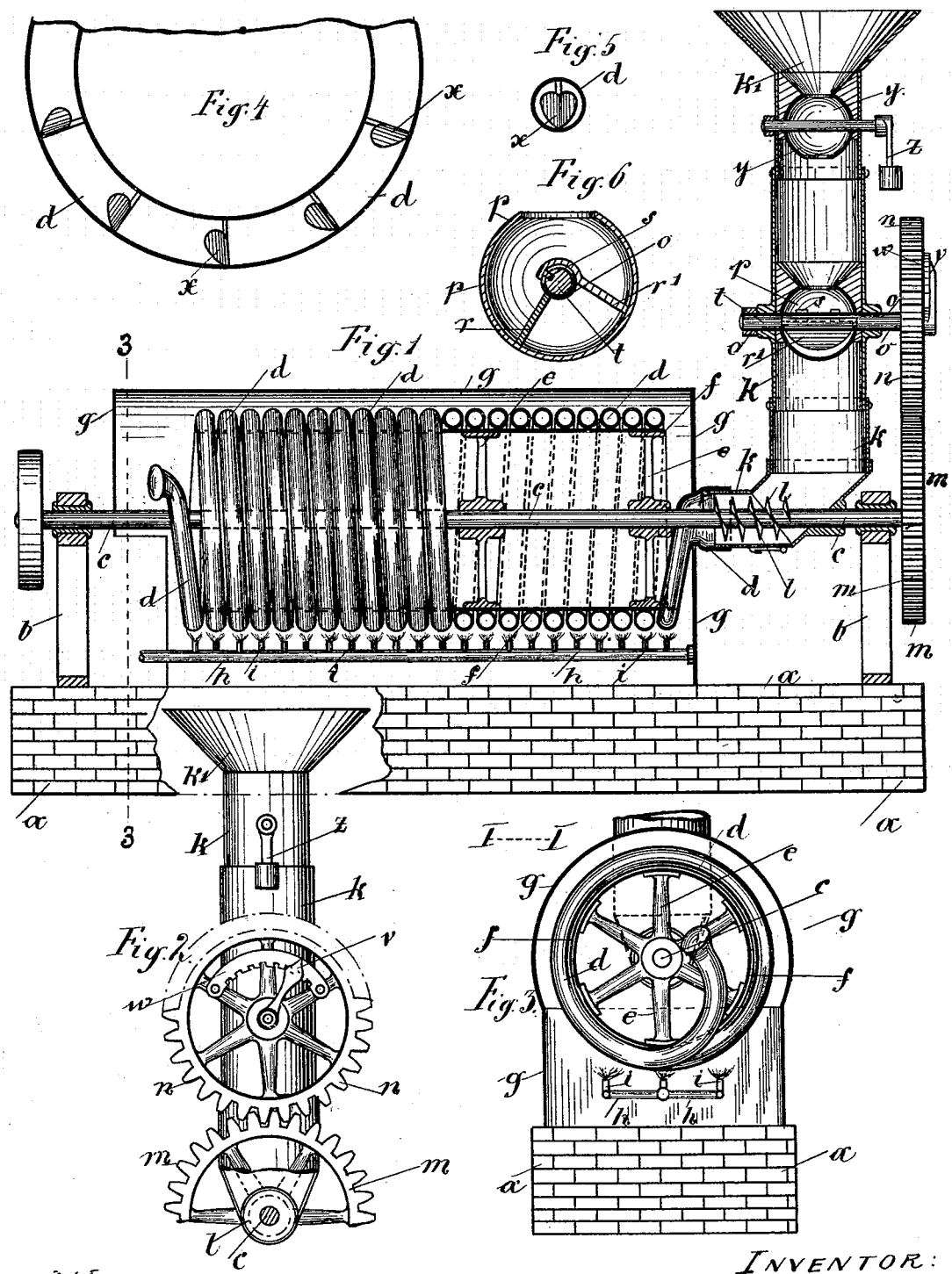

CARL ALEXANDER OTTO, OF DRESDEN, GERMANY.

APPARATUS FOR ROASTING COFFEE, COCOA, &c.

SPECIFICATION forming part of Letters Patent No. 517,189, dated March 27, 1894.

Application filed October 5, 1893. Serial No. 487,219. (No model.) Patented in Germany October 4, 1889, No. 51,402, and in Austria-Hungary October 27, 1890, No. 48,086 and No. 5,697.

*To all whom it may concern:*

Be it known that I, CARL ALEXANDER OTTO, a subject of the King of Saxony, residing in the city of Dresden, in the Kingdom of Saxony, Germany, have invented certain new and useful Improvements in Apparatus for Roasting Coffee, Cocoa, &c., and Similar Materials, (for which I have obtained patents in Germany, No. 51,402, dated October 4, 1889, and in Austria-Hungary, No. 48,086 and No. 5,697, issued October 27, 1890,) of which the following is a specification.

The object of this invention is to provide a new and improved apparatus for roasting coffee, cocoa and the like, in such a manner that small quantities of the material to be roasted are constantly fed into the apparatus and in the same are subjected to the action of fire, hot air or any other means of heating, whereby the said materials are roasted very rapidly, uniformly and thoroughly.

In the accompanying drawings, Figure 1 is a longitudinal sectional view of my improved apparatus for roasting coffee, cocoa and the like, parts being broken out. Fig. 2 is a front view of the same, parts being omitted and others in section, and some broken out. Fig. 3 is a rear view of the apparatus, parts being broken out and parts in section, on the line 3 3, of Fig. 1. Fig. 4 is an enlarged detail longitudinal sectional view of part of the helical roasting tube. Fig. 5 is a cross sectional view of Fig. 4, and Fig. 6 is an enlarged detail transverse sectional view of the regulating device in the feed-chute of the machine.

Similar letters of reference indicate corresponding parts.

On a suitable foundation $a$, the standards $b$ are erected, in which the shaft $c$ is journaled. This said shaft $c$ supports the helically-wound tube $d$ by means of arms $e$, which preferably are connected with each other by a cylindrical casing $f$, or which may be connected by suitable rods. The helically-wound tube $d$ is surrounded by a fixed casing $g$, within which some suitable heating apparatus is provided, for example, a gas-heater, composed of the tubes $h$ and burners $i$, or provision may be made for conducting heated air into the casing $g$. Into the front enlarged end of the helically-wound tube $d$ the outlet tube $k$ of the feed-chute projects, through the lower part of which outlet neck $k$, a part of the shaft $c$ passes, which shaft is provided at that part of its length within the outlet neck $k$ with spiral conveyer-blades $l$, which serve to conduct the material into the enlarged end of the helically-wound tube $d$. The shaft $c$ is provided at one end with a belt-pulley or other suitable power-transmitting device, by means of which the shaft $c$ and the helically-wound tube can be rotated and the material gradually conveyed through said tube to the outlet end $e$ of the same. That end of the shaft opposite the one provided with the belt-pulley carries a cog-wheel $m$ that engages a second cog-wheel $n$ fixed on the tubular shaft $o$, which in turn is journaled transversely in the feed-chute $k^2$. On the said tubular shaft a hollow ball $p$ is mounted within the feed-chute $k^2$ and serves for delivering the material to the rotating helical tube at proper intervals. The hollow ball $p$ is provided with an opening, through which the material can pass into said ball, and when the ball has made half a revolution under the action of the cog-wheels $m$ $n$ the material can drop out of the hollow ball and into the outlet-neck $k$ or tube of the feed-chute. For the purpose of permitting an adjustment of the capacity of the said hollow ball, it is provided in its interior with a fixed wing $r$ and an adjustable wing $r'$. The latter is fastened by screws that pass through slots of the tubular shaft $o$ into a solid shaft $t$ that passes longitudinally through the tubular shaft $o$ and is provided at its outer end with a fixed hand $v$ that can be locked in different positions by engaging its ends with the notches of a notched segment $w$ fastened to the spokes of the wheel $n$. By turning this hand the solid shaft $t$ and with it the wing $r'$ are turned so as to be a greater or less distance from the fixed wing $r$, whereby the capacity of the ball is increased or decreased. As the hand $v$ is locked to the notched segment $w$ on the wheel $m$ the solid shaft $t$ is compelled to rotate with the hollow shaft. In the upper part of the feeding-chute directly below the hopper $k'$ a second hollow ball $y$ with two diametrically opposite openings is fixed on a shaft mounted to turn in the feed-chute which shaft is provided at one end with an arm $z$ carrying a weight. When said weight hangs downward the two openings of the ball $y$ will be in line with the bottom opening of the hopper and the material can pass through said ball into the ball $p$. If the arm $z$ is turned ninety degrees so that the ball $y$ closes the bottom opening of the hopper, none of the material can pass into the lower ball $p$. In the helically-wound tube a series of heart-shaped partitions or stops $x$ are arranged which serve for the purpose of thoroughly mixing and agitating the material passing through said tube.

The material to be roasted, for example, coffee, cocoa, malt or other substances, passes from the hopper $k'$ and the ball $y$ below the same into the feed-chute $k^2$ and by the lower ball $p$ is delivered in uniform quantities into the outlet neck of the feeding chute and from said outlet neck passes into the helically-wound roasting tube. The material is fed into the roasting tube in uniform quantities, for example, so that an equal quantity of the material is in each turn of the helical tube.

Although the material to be roasted passes into the helical tube, which is of a very small diameter, very rapidly, every part of the material comes in contact with the hot metal walls of said roasting tube and is thus roasted in a very short time and without any loss by volatilization of the volatile oils contained in coffee, cocoa, &c.

Having thus described my invention, I claim as new and desire to secure by Letters Patent—

1. An apparatus for roasting coffee, cocoa and the like, constructed with a horizontal rotary shaft, a helically wound tube supported by said shaft, means for heating the tube, an inlet neck projecting into one end of said helically wound tube, and a conveyer within said neck, and fixed on the above mentioned horizontal shaft, substantially as set forth.

2. In a machine for roasting coffee and other substances, the combination, with a rotative helically-wound tube, means for heating the tube, an inlet neck connected with one end of said rotative tube, a feeding-chute connected with the neck, a ball provided with an opening mounted to turn in the feeding-chute, and means for turning said ball from the shaft of the helically-wound tube, substantially as set forth.

3. In a machine for roasting coffee, cocoa and other substances, the combination, with a rotative helically wound tube, of a feeding-chute connected with one end of said tube, a hollow ball mounted to turn in said tube, which ball has an opening, means for rotating said ball from the shaft of the rotative helical tube, and an adjustable partition in said ball, substantially as set forth.

4. In a machine for roasting coffee, cocoa and other substances, the combination with a rotative helically-wound tube, of a feeding-chute connected with one end of the same, a hollow ball provided with an opening mounted on a hollow shaft in said feeding-chute, an adjustable partition in said ball, which partition is connected with a fixed shaft passed through the above mentioned hollow shaft, a fixed partition in the ball, means for rotating the hollow shaft from the shaft of the rotative helically-wound tube, and means for connecting the hollow shaft with the rigid shaft therein, substantially as set forth.

5. A machine for roasting coffee, cocoa and other substances, constructed with a rotative helically-wound tube and a series of heart-shaped blades in said tube, substantially as set forth.

In testimony that I claim the foregoing as my invention I have hereunto set my hand in the presence of two witnesses.

CARL ALEXANDER OTTO.

Witnesses:
 RIN. SCHMIDT,
 HERNANDO DE SOTO.